March 16, 1954
H. A. CLARK
2,672,105
BAKING PAN, COATING COMPOUNDS, AND
METHODS OF PREPARATION AND BAKING
Filed Sept. 2, 1949
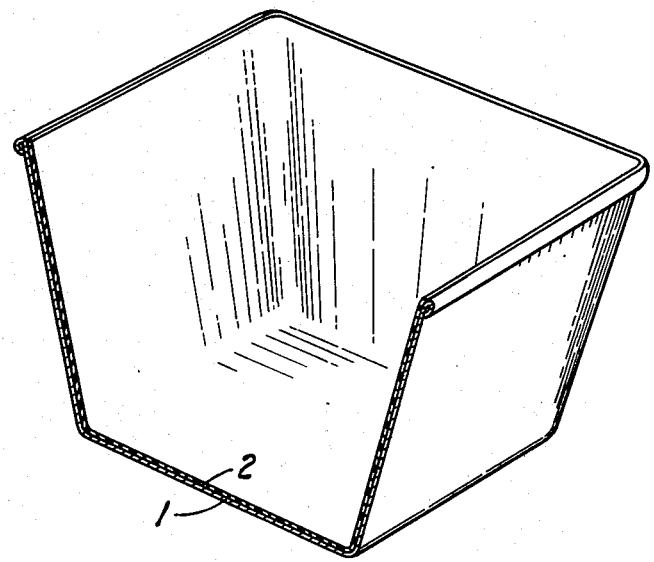
INVENTOR.
HAROLD A. CLARK
BY Robert F. Fleming Jr.
ATTORNEY Patented Mar. 16, 1954

2,672,105

UNITED STATES PATENT OFFICE 2,672,105

BAKING PAN, COATING COMPOUNDS, AND METHODS OF PREPARATION AND BAKING

Harold A. Clark, Midland, Mich., assignor to Dow Corning Corporation, Midland, Mich., a corporation of Michigan Application September 2, 1949, Serial No. 113,900

12 Claims. (Cl. 107—54)

The present invention relates to high molecular weight resins containing polysilane bonding and polysiloxane bonding and to their method of production.

Heretofore, in the organosilicon industry the resins which have become of major importance are organopolysiloxanes. These resins are of major importance due to their great thermostability as compared to the previous organic type resins.

In my copending application, Serial No. 99,338, filed June 15, 1949, now U. S. Patent No. 2,563,005, issued August 7, 1951 I have disclosed the production of polysilane resins. In these resins the molecules are interconnected by silicon to silicon bonding, the remaining valences being satisfied by phenyl and methyl radicals.

The resins in accord with the present invention are polymers containing polysilane and polysiloxane type bondings. In these resins some of the silicon atoms in the molecules thereof are interconnected by silicon to silicon bonding and some of the silicon atoms are interconnected by silicon to oxygen bonding, the remaining valences of the silicon atoms being satisfied by phenyl and methyl radicals. These resins are high molecular weight polymers with an average composition of $[(CH_3)_a(C_6H_5)_bSiO_c]$ in which $a+b$ has a value of from 1.4 to 2 inclusive, $c$ has a positive value and $a+b+2c$ has a value of up to 3.5. Between 30 and 75 per cent of the total phenyl and methyl radicals are phenyl radicals.

These polysilane-polysiloxane resins possess wholly unexpected properties. Organosiloxane resins in the upper portion of the range between 1 and 2 organic radicals per silicon atom are generally of a cheesy nature. In general, the organosiloxane resins with desirable properties are in the lower portion of the range between 1 and 2 organic radicals per silicon atom. The unexpected thing which was discovered about the resins of the present invention is that the properties of the resins are most desirable when the resin has a degree of substitution of from 1.4 to 2 total phenyl and methyl radicals per silicon atom. Below 1.4 the resins are brittle and have less desirable characteristics.

Another outstanding characteristic of these resins is the length of cure necessary. These resins require a very short time for cure in comparison with conventional polysiloxane resins. It has been found that these resins cure in as short a time as less than 40 minutes at 250° C. A comparable polysiloxane resin did not cure within 5 hours at 250° C. After curing, the resins are very flexible and tough, and are not frangible.

In accord with the method of the present invention these resins are prepared by partially hydrolyzing an organochlorosilane by reaction with water. The oxychloride so produced is then reacted with an alkali metal.

The organochlorosilanes used to prepare the oxychlorides of the present invention have the general formula $(CH_3)_a(C_6H_5)_bSiCl_{4-a-b}$ in which $a+b$ has a value of from 1.4 to 2 inclusive. Suitable chlorosilanes which may be used are methyltrichlorosilane, phenyltrichlorosilane, phenylmethyldichlorosilane, diphenyldichlorosilane, dimethyldichlorosilane, triphenylchlorosilane, diphenylmethylchlorosilane, phenyldimethylchlorosilane and trimethylchlorosilane. Phenylmethyldichlorosilane alone or a mixture of any of these chlorosilanes may be employed. The chlorosilanes in the mixture are proportioned in such relative amounts as to provide mixtures of the defined character.

The organosilicon oxychloride reactants of the present invention have the general formula $(CH_3)_a(C_6H_5)_bSiO_cCl_n$ in which $a+b$ has a value of from 1.4 to 2 inclusive, $c$ has a positive value, $a+b+2c$ has a value of up to 3.5 and $a+b+2c+n$ has a value of 4. These oxychlorides may be prepared by hydrolyzing and condensing by reaction with water up to 80 per cent of the chlorine present in the phenyl and methyl substituted chlorosilanes.

A variation of the method of the present invention involves partially hydrolyzing an organochlorosilane of the general formula $R_nSiCl_{4-n}$ in which R is selected from the group consisting of phenyl and methyl radicals and $n$ has a value of from 1 to 3 inclusive. This partially hydrolyzed product is then mixed with an additional amount of the organochlorosilane to prepare a mixture of the average oxychloride general formula above stated. Up to 80 per cent of the chlorine present in the total amount of organochlorosilane used is hydrolyzed and condensed by reaction with water.

Following preparation of the oxychloride, it is reacted with an alkali metal, either by adding the oxychloride to the alkali metal or the alkali metal to the oxychloride.

When the oxychloride is reacted with an alkali metal, the molecule so produced contains both polysilane and polysiloxane type bondings. When this method is varied and the oxychloride is mixed with an additional amount of a chlorosilane and the mixture reacted with an alkali metal, the molecule likewise contains both types of bonding, polysilane and polysiloxane. This is true since there is sufficient chlorine present in the silicon oxychloride to tie in the added amount of chlorosilane.

The alkali metal may be sodium, potassium, caesium, rubidium or lithium. If desired, the sodium-potassium eutectic may be used. But in general it is desirable to employ either sodium or potassium due to their commercial availability.

It is desirable to have the alkali metal in a finely divided state to accelerate the rate of reaction. The alkali metal may be molten alkali metal dispersed in a diluent such as a liquid aliphatic or aromatic hydrocarbon. Fine dispersion of the alkali metal in solid form in such a diluent may also be employed. Likewise, the alkali metal may be employed in the form of wire or small cut pieces.

The reaction with the alkali metal is conducted with the organosilicon material in liquid phase. The temperature at which this reaction is conducted is not critical. It may be conducted at room temperature or above. The reaction which is exothermic may be operated under reflux whereby the heat of reaction is dissipated by the cooling of the refluxing solvent, or the heat may be dissipated by indirect heat exchange at below reflux temperature.

The resins of the present invention may be used to coat bread pans internally. Following coating of the pans with the resin, the resin is dried to remove solvent. The pan so coated may be employed, either directly to bake bread in which case the resin is cured during use, or it may be heated to cure the resin and then used for baking. Bread may then be repeatedly baked in such pans without the necessity of using any grease.

One embodiment of this invention is shown in the accompanying drawing. The drawing is a sectional view of a bread pan 1 coated on the inner side with an organopolysilane-siloxane resin 2.

The pans to which the resin is applied should be clean in order to obtain the best results. In case the pans are new, the temporary coating should be burned off in accordance with customary bakery practice. If used pans are to be employed, they should be cleaned of all grease and flour. Conventional bakery cleaning practice is satisfactory for this purpose. It is desirable for the pans to be relatively free of finger prints at the time of coating with the resin.

The pans are then coated with a solution of the organopolysilane-siloxane resin. Coating may be effected by spraying, brushing or dipping. Any excess resin is drained from the pans and the pans are then dried. The pans which carry a resin coating on their internal surface are then allowed to air dry. If desired the resin may be cured by heating to a temperature of from 400 to 500° F., though this is not necessary as the resin will cure during baking of the bread. The degree of cure may be increased by heating at a higher temperature or for a longer time or by the inclusion of a catalyst in the resin.

The pans so prepared which carry a film of cured resin are then ready for the baking operation. The loaf to be baked is placed in the pan without greasing of the pan. After baking the loaf can be turned out of the pan which is then ready for another loaf. No banging on the pan is necessary to loosen the baked bread loaves.

The resins may be dissolved in any of the customary solvents such as benzene, toluene, xylene, naphtha and acrylic petroleum thinners.

These resins may be applied to surfaces to be coated either in solution in an organic solvent or they may be employed in a state free of solvent. When free of solvent, the resins of the present invention are thermoplastic solids or are highly viscous fluids at room temperature.

The resins of the present invention may be blended so as to modify their properties. The resins may be blended with each other, with organosiloxane resins, with polysilane resins, with silicone alkyd resins, with natural resins, such as wood rosin, copal, shellac etc., with synthetic resins such as phenolaldehyde resins, urea-aldehyde resins, alkyd resins, cumar resins, vinyl resins, esters of acrylic and methacrylic acid etc., with cellulose esters as for example, cellulose nitrate, cellulose acetate and cellulose p-toluene-sulphonate, and with cellulose ethers, as for example, methyl cellulose, ethyl cellulose, propyl cellulose, butyl cellulose, benzyl cellulose, allyl cellulose and hydroxy ethyl cellulose.

A solution of the resin may be used directly as a varnish, or the solution may have a pigment such as aluminum powder added to it. Paints or enamels containing the resins hereof may be cured by heating following coating.

Such resin mixtures, pigmented with a powdered aluminum and thinned with a volatile solvent, are desirable for such uses as coating ovens, smoke stacks and exhaust manifolds.

Catalysts such as lead, zinc, cobalt and manganese salts may be employed to accelerate the rate of setting, or to lower the temperature required to bring about setting of the resins.

The resins of the present invention are of utility for electrical insulation and due to their toughness, durability and flexibility also make excellent magnet wire enamels.

*Example 1*

A mixture of 129 parts by weight of $(CH_3)_2SiCl_2$, 191 parts of $C_6H_5CH_3SiCl_2$ and 211.5 part of $C_6H_5SiCl_3$ was diluted with an equal volume of dry ether. 45 parts of water were then added gradually to the mixture. The ether and HCl were then removed by vacuum. The mixture was then heated to 110° C. under vacuum. 380 parts of product remained.

The product produced above was gradually added to 48 parts of molten sodium in 500 parts of refluxing toluene. The addition time was one hour. The reaction mixture was then refluxed and stirred for 18 hours. Since the viscosity was quite high, an additional 300 parts of toluene were added before filtration. The product was next cooled and filtered. There was a yield of 733 parts of resin solution containing 58 per cent resin solids. This resin cured in less than 40 minutes at 250° C. This resin after curing is tough and flexible.

To compare a polysiloxane resin produced using the same amounts of chlorosilanes and produced according to a conventional method the following resin was prepared: 166.4 parts by weight of $(CH_3)_2SiCl_2$, 286.6 parts of $C_6H_5CH_3SiCl_2$ and 317.3 parts of $C_6H_5SiCl_3$ were mixed and diluted with 891 parts of toluene. This mixture was then added to 1490 parts of cold water. After agitation the resin was washed acid free with hot water and concentrated to 100 per cent solids by heating at 250° C. at 100 mm. The resin was then dissolved in toluene yielding 560 parts of resin solution containing 74.4 per cent solids. This resin did not cure within 5 hours at 250° C.

The organopolysilane-polysiloxane resin and the organopolysiloxane resin were prepared using the same amounts of organochlorosilane reactants, namely equimolar amounts of $C_6H_5CH_3SiCl_2$ $C_6H_5SiCl_3$ and $(CH_3)_2SiCl_2$. In comparing the results obtained with the two resins, it was found that the polysilane-polysiloxane resin cured in less than 40 minutes at 250° C., while the comparable polysiloxane did not cure within five hours at 250° C.

*Example 2*

4500 parts by weight of $C_6H_5CH_3SiCl_2$ were gradually added into the top of a contacting column through which it flowed downward against ascending steam. 318 parts of steam were measured so as to hydrolyze 75 per cent of the hydrolyzable chloride present in the chlorosilane. This partial hydrolysis yielded a material the average composition of which is $Cl(C_6H_5CH_3SiO)_3SiC_6H_5CH_3Cl$.

300 parts by weight of this polymer were gradually added to 25 parts of molten sodium in 500 parts of refluxing toluene. The addition time was 45 minutes. The mixture was then refluxed for 16 hours, cooled and filtered. 845 parts of resin solution containing 30.2 per cent resin solids were produced.

*Example 3*

300 parts by weight of the chlorine end blocked polymer produced in Example 2 and 95.5 parts of $C_6H_5CH_3SiCl_2$ were gradually added to 50 parts of sodium in 500 parts of toluene. The addition time was one hour. The mixture was then stirred and refluxed for 17 hours, after which time it was cooled and filtered. 855 parts of resin solution were obtained. This solution contained 35.5 per cent resin solids. The resin cured in 3 hours at 250° C. A panel may be coated with this resin and cured for 3 hours at 250° C. The resin is sufficiently flexible so that the panel could be bent over a ⅛ inch mandrel without breaking the resin.

*Example 4*

300 parts by weight of the chlorine end blocked polymer obtained in Example 2 and 141 parts of $C_6H_5SiCl_3$ were gradually added to 73 parts of sodium in 500 parts of toluene. The addition time was 1½ hours. The mixture was then stirred and refluxed for 18 hours, after which time it was cooled and filtered. 923 parts of resin solution containing 35.8 per cent resin solids were obtained. This resin cured in one hour at 250° C. After 3 hours at 250° C., the resin cures to a hard, tough flexible film.

*Example 5*

A mixture of 100 parts by weight of $C_6H_5CH_3SiCl_2$ and 166 parts of $C_6H_5SiCl_3$ was diluted with an equal volume of dry ether. 9 parts of $H_2O$ were then added dropwise. The ether and HCl were next removed. The reaction mixture was then heated to 100° C. 300 parts of anhydrous toluene were then added to the mixture. This mixture was then brought to reflux temperature and 55 parts of sodium were added in small pieces. The addition time was 1½ hours. The reaction mixture was then refluxed and after agitation for 16 hours the mixture was next cooled and filtered. The filtrate was treated with $NaHCO_3$ and anhydrous ethanol to remove the last traces of chloride. 244 parts of resin solution containing 65.5 per cent of solids was obtained. This resin air dries to a high gloss. Good flexibility is obtained after 3 hours at 250° C.

That which is claimed is:

1. The method of preparing an organopolysilane-polysiloxane resin which comprises reacting an organochlorosilane having the general formula $(CH_3)_a(C_6H_5)_bSiCl_{4-a-b}$ in which $a+b$ has a value of 1.4 to 2 inclusive and in which between 30 percent and 75 percent of the total phenyl and methyl radicals are phenyl radicals, with water in amount sufficient to cause hydrolysis and condensation of up to 80 percent of the chlorine present in the said organochlorosilane, reacting an alkali metal with the oxychloride so formed and which has the general formula $(CH_3)_a(C_6H_5)_bSiO_cCl_n$ in which $c$ has a positive value, $a+b+2c$ has a value of up to 3.5, and $a+b+2c+n$ has a value of 4, whereby there is produced an organopolysilane-polysiloxane resin with an average composition of $[(CH_3)_a(C_6H_5)_bSiO_c]$ 2. The method in accord with claim 1 where the alkali metal is sodium.

3. The method of preparing an organopolysilane-polysiloxane resin which comprises partially hydrolyzing an organochlorosilane having the average general formula $R_nSiCl_{4-n}$ in which R is selected from the group consisting of phenyl and methyl radicals and $n$ has a value of from 1 to 3 inclusive by reacting the organochlorosilane with water, mixing the partially hydrolyzed product thereof with an additional amount of an organochlorosilane of the aforesaid general formula so that the oxychloride mixture has the general formula $(CH_3)_a(C_6H_5)_bSiO_cCl_n$ in which $a+b$ has a value of from 1.4 to 2 inclusive, $c$ has a positive value, $a+b+2c$ has a value of up to 3.5, $a+b+2c+n$ has a value of 4 and in which from 30 to 75 per cent of the total methyl and phenyl radicals are phenyl radicals, and so that up to 80 per cent of the chlorine in the oxychloride mixture is hydrolyzed and condensed, reacting said mixture with an alkali metal, whereby there is produced an organopolysilane-polysiloxane resin with an average composition of $[(CH_3)_a(C_6H_5)_bSiO_c]$ 4. The method in accord with claim 3 where the alkali metal is sodium.

5. The method of preparing an organopolysilane-polysiloxane resin which comprises reacting an alkali metal with an organosilicon oxychloride of the general formula $(CH_3)_a(C_6H_5)_bSiO_cCl_n$ in which $a+b$ has a value of from 1.4 to 2 inclusive, $c$ has a positive value, $a+b+2c$ has a value of up to 3.5, $a+b+2c+n$ has a value of 4 and in which between 30 and 75 percent of the total phenyl and methyl radicals are phenyl radicals, whereby there is produced an organopolysilane-polysiloxane resin with an average composition of $[(CH_3)_a(C_6H_5)_bSiO_c]$.

6. The method in accord with claim 5 where the alkali metal is sodium.

7. Organopolysilane-polysiloxane resins with an average composition of $[(CH_3)_a(C_6H_5)_bSiO_c]$ in which $a+b$ has a value of from 1.4 to 2 inclusive, $c$ has a positive value, $a+b+2c$ has a value of up to 3.5 and in which from 30 to 75 percent of the total phenyl and methyl radicals are phenyl radicals.

8. Organopolysilane-polysiloxane resins with an average composition of $[(CH_3)C_6H_5SiO_c]$ in which $c$ has a positive value of up to 0.75.

9. The method of preparing a bread pan for the baking of bread which comprises coating the internal surfaces of the pan with an organopolysilane-polysiloxane resin with an average composition of $[(CH_3)_a(C_6H_5)_bSiO_c]$ in which $a+b$ has a value of from 1.4 to 2 inclusive, $c$ has a positive value, $a+b+2c$ has a value of up to 3.5 and in which 30 to 75 per cent of the total phenyl and methyl radicals are phenyl radicals.

10. The method of baking bread which comprises baking the bread in contact with a supported film of an organopolysilane-polysiloxane resin with an average composition of $$[(CH_3)_a(C_6H_5)_bSiO_c]$$

in which $a+b$ has a value of from 1.4 to 2 inclusive, $c$ has a positive value, $a+b+2c$ has a value of up to 3.5 and in which 30 to 75 per cent of the total phenyl and methyl radicals are phenyl radicals, whereby release of the bread baked in the pan is obtained without the use of grease.

11. The method which comprises coating the internal surfaces of a bread pan with an organopolysilane-polysiloxane resin with an average composition of $[(CH_3)_a(C_6H_5)_bSiO_c]$ in which $a+b$ has a value of from 1.4 to 2 inclusive, $c$ has a positive value, $a+b+2c$ has a value of up to 3.5 and in which 30 to 75 per cent of the total phenyl and methyl radicals are phenyl radicals, curing the resin by heating and repeatedly baking bread in the pan so coated with the bread in contact with the resin during baking, whereby release of the bread in the pan is obtained without the use of grease.

12. A bread pan having a cooking surface consisting of a thin coating of a hardened organopolysilane-polysiloxane resin with an average composition of $[(CH_3)_a(C_6H_5)_bSiO_c]$ in which $a+b$ has a value of from 1.4 to 2 inclusive, $c$ has a positive value, $a+b+2c$ has a value of up to 3.5 and in which 30 to 75 per cent of the total phenyl and methyl radicals are phenyl radicals.

HAROLD A. CLARK.

References Cited in the file of this patent

UNITED STATES PATENTS

| Number | Name | Date |
| --- | --- | --- |
| Re. 16,431 | Kratzer | Sept. 21, 1926 |
| 1,328,556 | Bloch | Jan. 20, 1920 |
| 2,061,149 | Garrett | Nov. 17, 1936 |
| 2,165,154 | Freese | July 4, 1939 |
| 2,398,672 | Sauer | Apr. 16, 1946 |
| 2,450,594 | Hyde | Oct. 5, 1948 |
| 2,462,242 | Webb | Feb. 22, 1949 |
| 2,463,870 | Hansen | Mar. 8, 1949 |
| 2,470,479 | Ferguson et al. | May 17, 1949 |
| 2,470,593 | Webb | May 17, 1949 |
| 2,483,209 | Lamoreaux | May 17, 1949 |
| 2,494,920 | Warrick | Jan. 17, 1950 |
| 2,554,976 | Burkhard | May 29, 1951 |
| 2,563,005 | Clark | Aug. 7, 1951 |

OTHER REFERENCES

Kipping et al.: Journ. Chem. Soc. (London), vol. 119, pages 830–847 (1921). (Copy in Sci. Lib.)